(12) United States Patent
Hong

(10) Patent No.: US 8,209,762 B2
(45) Date of Patent: Jun. 26, 2012

(54) APPROACH FOR PRINTING LOCKED PRINT DATA USING USER AND PRINT DATA AUTHENTICATION

(75) Inventor: Jiang Hong, Cupertino, CA (US)

(73) Assignee: Ricoh Company, Ltd., Tokyo (JP)

( * ) Notice: Subject to any disclaimer, the term of this patent is extended or adjusted under 35 U.S.C. 154(b) by 603 days.

(21) Appl. No.: 12/144,926

(22) Filed: Jun. 24, 2008

(65) Prior Publication Data

US 2009/0320127 A1 Dec. 24, 2009

(51) Int. Cl.
*G06F 7/04* (2006.01)
(52) U.S. Cl. ............................................. 726/26; 726/31
(58) Field of Classification Search .................. 726/26, 726/31
See application file for complete search history.

(56) References Cited

U.S. PATENT DOCUMENTS

| | | | |
|---|---|---|---|
| 2002/0042884 A1* | 4/2002 | Wu et al. ........................ | 713/201 |
| 2003/0145200 A1* | 7/2003 | Eden ............................. | 713/161 |
| 2005/0289076 A1* | 12/2005 | Lambert ......................... | 705/59 |
| 2008/0120506 A1* | 5/2008 | Yamauchi et al. ............. | 713/176 |
| 2008/0301439 A1* | 12/2008 | Hashimoto et al. ........... | 713/156 |

* cited by examiner

*Primary Examiner* — Christopher Brown
(74) *Attorney, Agent, or Firm* — Hickman Palermo Truong Becker Bingham Wong LLP

(57) ABSTRACT

An approach is provided for printing locked print data using user and print data authentication. The approach is applicable to a wide variety of contexts and implementations and includes the use of bi-directional security measures to ensure a secure transmission of a document to a printer and secure retrieval of the document from the printer by one or more intended recipients. In particular, the bi-directional security measures ensure that: 1) the document is received only by the intended recipient designated by the creator, 2) both the document's creator and the intended recipient are successfully authenticated, 3) the document received by the intended recipient is the document that was created by the creator, and 4) the document received by the intended recipient is identical to the document created by the creator.

8 Claims, 6 Drawing Sheets

APPROACH FOR PRINTING LOCKED PRINT DATA USING USER AND PRINT DATA AUTHENTICATION

FIELD OF THE INVENTION

This invention relates generally to printing devices, and more specifically, to an approach for printing locked print data using user and print data authentication.

BACKGROUND

The approaches described in this section are approaches that could be pursued, but not necessarily approaches that have been previously conceived or pursued. Therefore, unless otherwise indicated, the approaches described in this section may not be prior art to the claims in this application and are not admitted to be prior art by inclusion in this section.

The proliferation of computer technology and the growth of the Internet have greatly increased access to electronic information. The concerns over unauthorized access to electronic documents that contain confidential or sensitive information apply when those electronic documents are destined for printing after being submitted to a printer by scanning or transmitted to the printer via a computer network or the Internet.

Other types of concerns over unauthorized access to electronic documents containing confidential or sensitive information applies to electronic documents submitted to a printer by an authorized creator of the document, but printed by an unauthorized party. In this case, when an electronic document containing confidential or sensitive information is insecurely stored in a printer's memory, an unauthorized party, who gains access to the printer, may release the printing job containing the confidential document and potentially produce a number of unauthorized copies of that document.

Other types of concerns over unauthorized access to electronic documents containing confidential or sensitive information applies to electronic documents transmitted in an unencrypted form. If an electronic document is transmitted in an unencrypted form via a communications link to the printing device, an unauthorized party, who gains access to that communications link, can also easily intercept the electronic document in the unencrypted form. For example, an unauthorized party may eavesdrop on a wired communications link to gain access to electronic documents. Wireless networks are particularly vulnerable because an eavesdropper does not need physical access to a wired network and can instead eavesdrop remotely. Thus, an unauthorized party can monitor wireless communications with a printing device and intercept electronic documents being transmitted to the printing device.

Many approaches have been developed to prevent unauthorized access to electronic documents that contain confidential or sensitive information. For example, users of printing machines may have to be authenticated before they may proceed with printing, copying or document scanning jobs.

Numerous protection schemes have been implemented to secure electronic documents transmitted for printing. For example, electronic documents are encrypted before they are transmitted over public networks, such as the Internet. This makes it difficult, if not impossible, depending upon the encryption used, for an unauthorized party who intercepts an encrypted electronic document to recover the original electronic document.

Other solutions offer a so called "locked printing" feature. Printing devices configured with locked printing provide some type of control over the printing of electronic documents. When a printing device is configured with a locked printing and print data is sent to the printing device, a printed version of an electronic document is not generated until a recipient is verified at the printing device. Typically the recipient enters authentication data, such as a password, through an operation panel on the printing device. The printing device verifies the authentication data, and if successful, the printing device allows the electronic document to be printed.

One of the problems with conventional locked printing approaches is that the documents stored on a printing device are susceptible to unauthorized access by third parties. Locked print documents are conventionally stored on a printing device until an authorized recipient prints the locked print documents. During that time, an unauthorized third party may attempt to enter valid authentication data and gain access to the locked print data stored on the printing device. This is particularly problematic in situations where the locked print data contains sensitive information.

Based on the foregoing, there is a need for an approach for securely printing electronic documents that does not suffer from limitations of prior approaches.

SUMMARY

An approach is provided for printing locked print data using user and print data authentication. The approach is applicable to a wide variety of contexts and implementations, and comprises a mechanism of bi-directional security measures to ensure a secure sending of the document to the printer and secure retrieval of the document from the printer by the intended recipient.

The bi-directional security measures ensure that: 1) the document is received only by the intended recipient designated by the creator, 2) both the document's creator and the intended recipient are successfully authenticated, 3) the document received by the intended recipient is the document that was created by the creator, and 4) the document received by the intended recipient is identical to the document created by the creator.

The approach is applicable to various methods of submitting locked print data, including scanning a document to a printing device, transferring an electronic document data to the printing device via a computer network or the Internet, etc. The approach provides for various methods for submitting the document by the creator, various methods for authenticating the document's creator and the intended recipient of the document, and various methods for encrypting and decrypting the electronic version of the document data.

According to one embodiment of the invention, a printing device comprises a user interface, a scanning module and a locked print module, each communicatively coupled with a local memory.

The user interface is configured to display information to creators and recipients, receive creator authentication data, authenticate the creator using the creator authentication data, and, in response to successful authentication of the creator, cause retrieval of a creator private key associated with the creator. The creator may be authenticated using various authentication methods, including, but not limited to, an authentication using an authentication card.

The scanning module is configured to scan a printed document and store it as an electronic document in the local memory. Alternatively, the creator may submit their document from own client device (using a software application residing on the creator's client device) via a communications link between the creator's client device and the printing device's local memory.

The locked print module is configured to generate a digital signature using the electronic document and creator's private key. For example, the digital signature using the creator private key to encrypt the hash code of the electronic document. Further, the locked print module is also configured to, in response to a creator input, generate recipient data that specifies one or more intended recipients of the electronic document, a number of copies of the electronic version of the electronic document that each recipient is allowed to print, and creator identification data that identifies the creator of the creator document. In addition, the locked print module is further configured to store the recipient data in association with the electronic document.

Further, the locked print process is configured to retrieve the recipient data associated with the electronic document in response to successful authentication of the recipient and selection by the recipient of the electronic document from a list of documents displayed for the recipient. Further, the locked print process is configured to retrieve the creator identification data, and using the creator identification data, to retrieve the creator public key. Then, using the creator public key, the locked process can decrypt the encrypted digital signature to recover the first hash code, generate a second hash code using the electronic document and if the first hash code and the second hash code match, allow the recipient to print up to the number of copies of the decrypted electronic version of the electronic document

BRIEF DESCRIPTION OF THE DRAWINGS

In the figures of the accompanying drawings like reference numerals refer to similar elements.

DETAILED DESCRIPTION

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention. Various aspects of the invention are described hereinafter in the following sections:

I. OVERVIEW
II. APPROACH FOR PRINTING LOCKED PRINT DATA USING USER AND PRINT DATA AUTHENTICATION
  A. Architecture
  B. Functional Overview
    1) Operational Example of Printing Scanned Locked Print Data
    2) Another Operational Example of Printing Scanned Locked Print Data
III. IMPLEMENTATION MECHANISMS I. Overview An approach is provided for printing locked print data using user and print data authentication. The approach is applicable to a wide variety of contexts and implementations and includes the use of bi-directional security measures to ensure a secure transmission of a document to a printer and secure retrieval of the document from the printer by one or more intended recipients. In particular, the bi-directional security measures ensure that: 1) the document is received only by the intended recipient designated by the creator, 2) both the document's creator and the intended recipient are successfully authenticated, 3) the document received by the intended recipient is the document that was created by the creator, and 4) the document received by the intended recipient is identical to the document created by the creator.

The approach is applicable to various methods of submitting locked print data, including scanning a document to a printing device, transferring an electronic document data to the printing device via a computer network or the Internet, etc.

II. Approach for Printing Locked Print Data Using User and Print Data Authentication The printing of locked print data using user and print data authentication generally involves authenticating a creator of the document, designating the recipients of the document and the number of copies that each of the recipient is allowed to print, creating a digital signature of the document, authenticating the designated recipients, verifying that the document data has not been modified since it was digitally signed, and allowing the intended recipients to print up to the number of copies of the electronic version of the document.

A. Architecture

Figure 1:
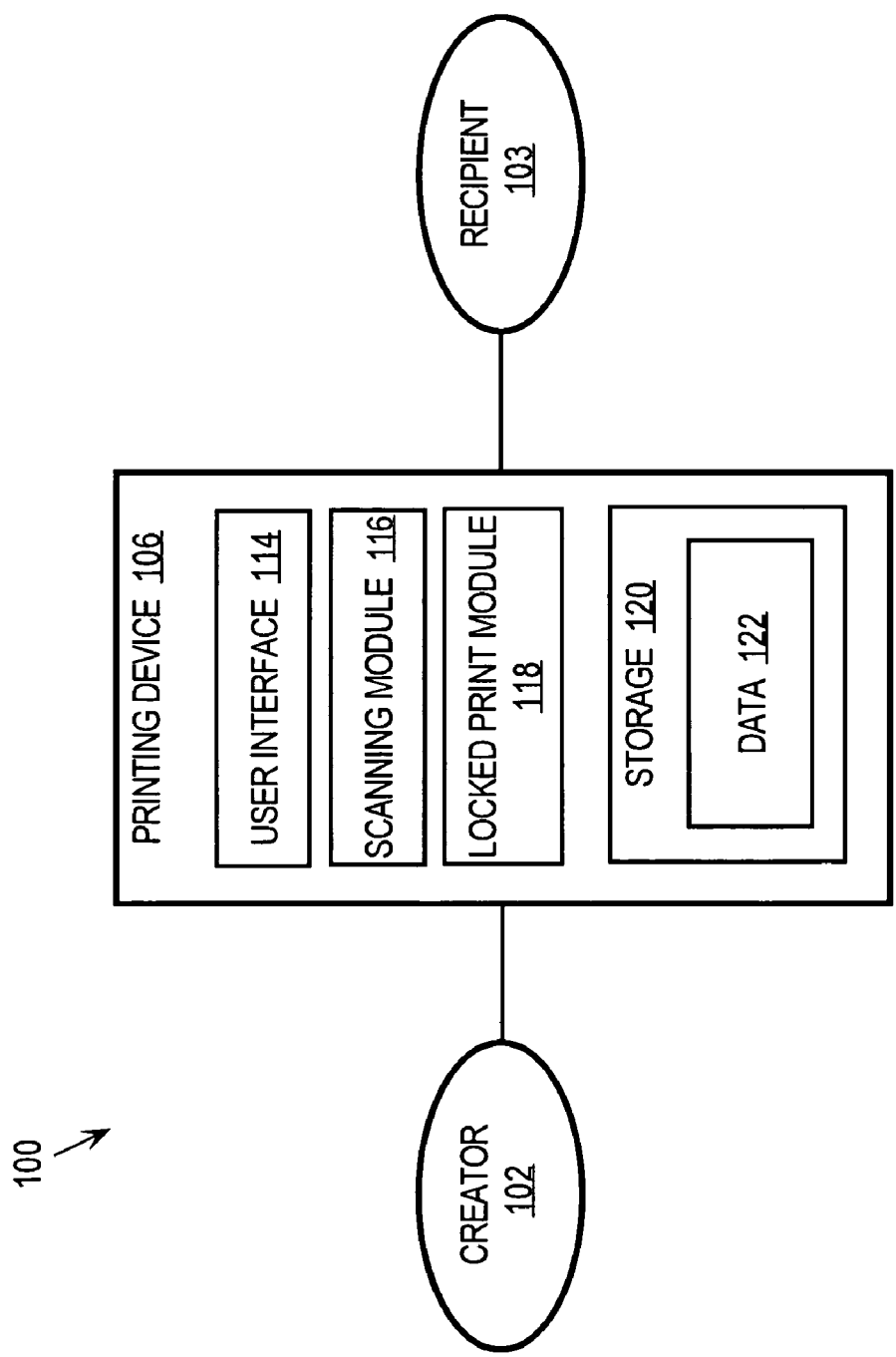
FIG. 1 is a block diagram that depicts an arrangement for printing locked print data using user and print data authentication, according to an embodiment of the invention.

FIG. 1 is a block diagram that depicts an arrangement 100 for printing locked print data using user and print data authentication. Arrangement 100 includes a document creator 102, a printing device 106 and a document recipient 103. Printing device 106 may be communicatively coupled to other devices and elements not depicted in FIG. 1.

In one embodiment, creator 102 is a user who uses printing device 106 and manually operates printing device 106. Similarly, in one embodiment, recipient 103 is a user who uses printing device 106 and manually operates printing device 106.

Creator 102 submits a document to printing device 106, whereas recipient 103 retrieves the document from printing device 106. The methods of submitting a document to printing device 106 and the methods of retrieving the document are described below.

Printing device 106 may be any device capable of printing electronic documents. Examples of printing device 106 include, without limitation, a printer, a copier, a facsimile and a Multi-Function Peripheral (MFP). An MFP is a peripheral device which incorporates the functionality of multiple devices in one device, and provides centralized document management, distribution and production. A typical MFP may act as a combination of some or all of the following devices: a printer, a scanner, a photocopier, a facsimile, and an e-mail station.

According to one embodiment of the invention, printing device 106 comprises a user interface 114, a scanning module 116, a locked print module 118 and a storage 120 for storing data 122. User interface 114, scanning module 116 and locked print module 118 are communicatively connected with each other and capable of storing data in storage 120 and retrieving data from storage 120.

Printing device 106 may be configured with other mechanisms, processes and functionalities, depending upon a particular implementation, and the approach described herein for printing locked print data using user and data authentication is not limited to any particular type of printing device 106.

User interface 114 may be any mechanism and/or medium that provides for the exchange of information between creator 102, recipient 103 and printing device 106. Examples of user interface 114 include, without limitation, a control panel with a display and keypad or keyboard, a cathode ray tube (CRT), a liquid crystal display (LCD), a keyboard, touchpad, mouse, trackball, a microphone and speakers, and any combination thereof.

In one embodiment, user interface 114 displays information to creators and recipients, receives data inputs from creators and recipients, stores and retrieves data 122 from storage 120, and authenticates creators and recipients. User interface 114 may comprise an operation panel for displaying information to creator 102 and recipient 103, and for entering information by the creator 102 and recipient 103. User interface 114 may include a display for conveying information to users and a touchpad, buttons, or touch screen for receiving user input.

Printing device 106 may be configured to display information on user interface 114 in any number of languages, depending upon a particular implementation. As with conventional printing devices, user interface 114 on printing device 106 may provide limited capability to easily enter alphanumeric strings.

Scanning module 116 may be implemented by one or more processes to receive a document from creator 102, scan the document to an electronic version of the document, process and store the electronic version of the document in storage 120. Scanning module 116 is configured to optically scan images, printed text, handwriting, or an object, and converts it to a digital image. Common examples of scanning module 116 implementations include a desktop (or flatbed) scanner, where the document is placed on a glass window for scanning; or a hand-held scanner, where the device is moved by hand. Modem scanners typically use a charge-coupled device (CCD) or a Contact Image Sensor (CIS) as the image sensor, whereas older drum scanners use a photomultiplier tube as the image sensor. A rotary scanner, used for high-speed document scanning, is another type of drum scanner, using a CCD array instead of a photomultiplier. Other types of scanners include planetary scanners, which take photographs of books and documents, 3D scanners, for producing three-dimensional models of objects, digital camera scanners, which are based on the concept of reprographic cameras, etc.

Scanning module 116 and locked print module 118 may be implemented as resident processes on printing device 106. Alternatively, scanning module 116 and locked print module 118 may be made available to printing device 106 on a removable media or may be implemented at a remote location with respect to printing device 106. Locked print module 118 may be implemented by one or more processes for providing locked print services on printing device 106.

Locked print module 118 may be implemented by one or more processes to process data 122 stored in storage 120. Various functions implemented in locked print module 118 include, but are not limited to, retrieving data 122 from storage 120, storing data 122 in storage 120, perform "locked-print" processing of data 122, determining whether data 122 may be delivered to recipient 103 designated by creator 102, and if the above determination is successful, delivering a specified number of copies of data 122 to the designated recipient 103.

In one embodiment, locked print module 118 comprises an encrypting and decrypting process configured to encrypt/decrypt data. As depicted in FIG. 1, the functionality of encryption/decryption process may be integrated into locked print module 118. Alternatively, the encrypting/decrypting process may be a separate module communicatively coupled with printing device 106 and locked print module 118.

Storage 120 may be implemented by any type of storage, including volatile storage, non-volatile storage, or any combination of volatile and non-volatile storage. Examples of storage 120 include, without limitation, random access memory (RAM) and one or more disks.

Storage 120 may be configured to store various types of data 122. For example, data 122, stored in storage 120, may comprise the electronic document received from creator 102 upon scanning the document by the scanning module 116 to printing device 106.

In other embodiments, data 122 stored in storage 120, may comprise an encrypted version of the electronic version of the document produced by locked print module 118 using the electronic document.

In other embodiments, data 122 stored in storage 120, may comprise a decrypted version of the electronic document produced by locked print module 118 using the encrypted version of the electronic document.

In other embodiments, data 122 stored in storage 120, may comprise a printed version of the decrypted electronic document, produced by the locked print module 118.

In other embodiments, data 122 stored in storage 120, may comprise digital certificate(s), user's identification data, hash data, etc.

In one embodiment, creator 102 submits a document to printing device 106 by user interface 114 of printing device 106 and feeding a printed copy of the document to printing device 106.

The components and processes depicted in FIG. 1 and described herein may be implemented in hardware, software, or any combination of hardware or software, depending upon a particular implementation.

Figure 2:
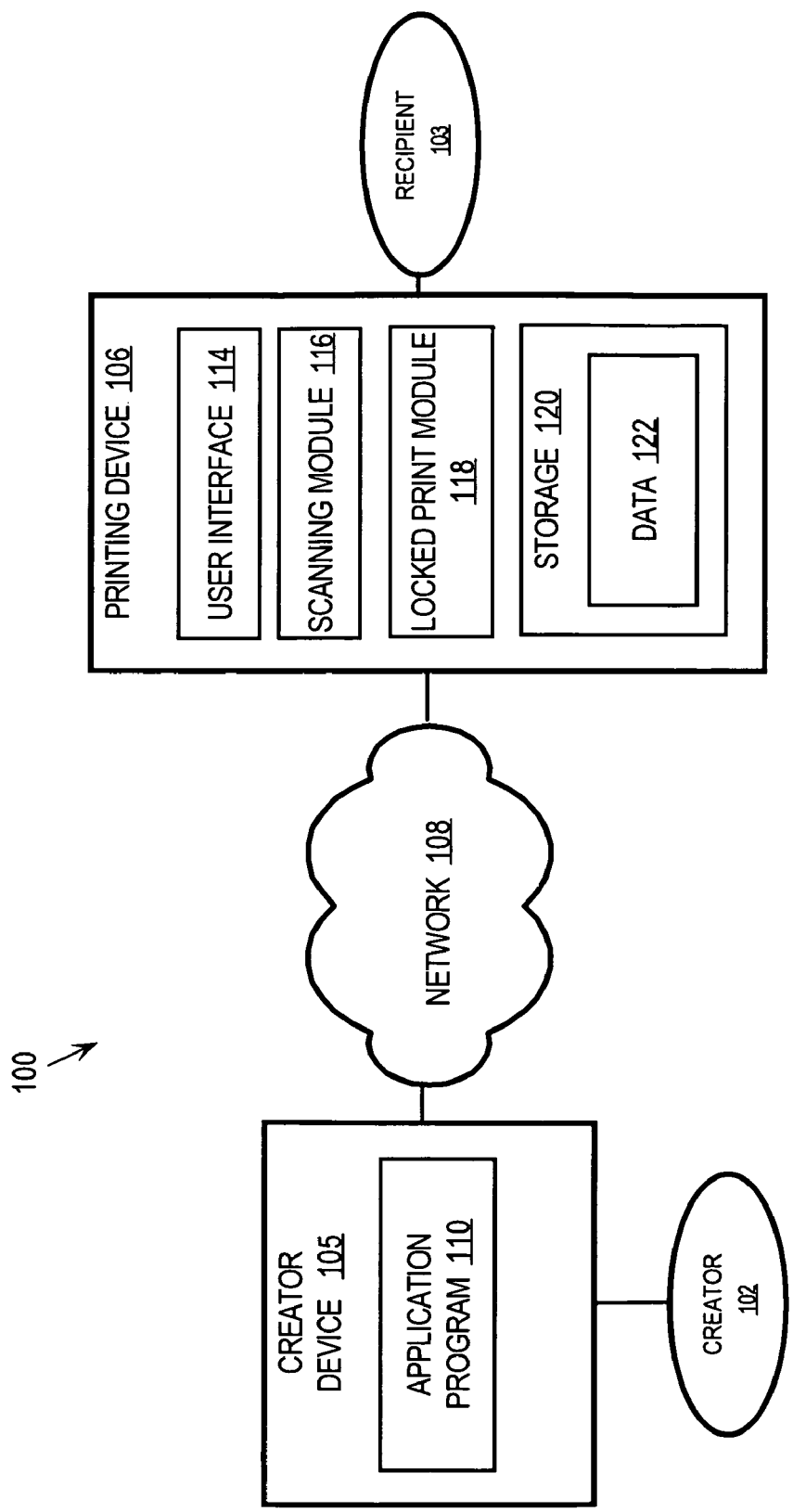
FIG. 2 is a block diagram that depicts an arrangement for printing locked print data using user and print data authentication, according to one embodiment of the invention.

FIG. 2 is a block diagram that depicts an arrangement 100 for printing locked print data using user and print data authentication, according to one embodiment of the invention. According to the embodiment illustrated in FIG. 2, creator 102 is communicatively coupled to a creator device 105, which is configured to create and process data in electronic format. Creator device 105 in FIG. 2 may be any type of a "client" device communicatively coupled with printing device 106 via a network 108, or communicatively coupled with printing device 106 via any other communications links established between creator 102 and printing device 106. Examples of creator device 105 implemented in the "client" device include, without limitation, a workstation, a personal computer, a Personal Digital Assistant (PDA), any type of mobile device and a cellular telephone.

According to one embodiment of the invention, creator device 105 may execute an application program 110. Application program 110 may be any process capable of generating print data. Examples of application program 110 include, without limitation, a word processor, a spreadsheet program, an email client, a Web browser, a photo management program and a drawing or computer-aided design (CAD) program.

An output of application program 110 may comprise an electronic document created by creator 102, and may be sent by application program 110 via network 108 to printing device 106 to be stored in storage 120 as electronic document data 122.

In one embodiment, creator device 105 may receive data from a portable media. Portable media may be any type of storage media that is capable of storing electronic version of data and interfacing with creator device 105. Examples of portable media include, without limitation, memory sticks, smart cards, flash memory cards, access cards, portable disk drives and any other type of non-volatile memory.

In this embodiment, the electronic document stored in the portable media may be sent by the portable media via the network 108 to the printing device 106 to be stored in storage 120 as electronic document data 122.

Network 108 may be implemented by any type of medium and/or mechanism (wired or wireless) that facilitates the exchange of information between client device 102 and printing device 106. Furthermore, network 108 may use any type of communications protocol and may be secured or unsecured, depending upon the requirements of a particular application.

B. Functional Overview

An approach is provided for printing locked print data using user and print data authentication. The approach is applicable to a wide variety of contexts and implementations and includes the use of bi-directional security measures to ensure a secure transmission of a document to a printer and secure retrieval of the document from the printer by one or more intended recipients.

In particular, the bi-directional security measures ensure that: 1) the document is received only by the intended recipient designated by the creator, 2) both the document's creator and the intended recipient are successfully authenticated, 3) the document received by the intended recipient is the document that was created by the creator, and 4) the document received by the intended recipient is identical to the document created by the creator.

The approach is applicable to various methods of submitting locked print data, including scanning a document to a printing device, transferring an electronic document data to the printing device via a computer network or the Internet, etc.

According to this approach, a creator of a document is authenticated, the creator specifies the recipients of the document and how many copies each of them may print, the electronic document is digitally signed, and upon successful authentication of the designated recipient of the electronic document, and if the electronic document has not been altered, the electronic document can be printed up to the specified number of times.

1) Operational Example of Printing Scanned Locked Print Data

Figure 3:
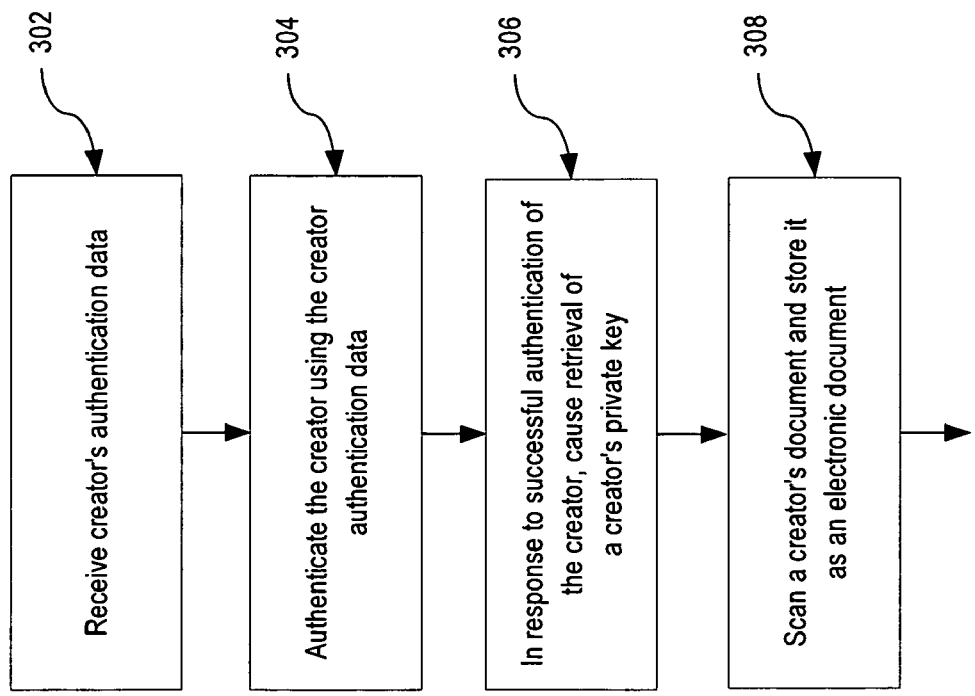
FIG. 3 is a flow diagram that depicts an approach for authenticating a creator of a document, according to one embodiment of the invention.

FIG. 3 is a flow diagram that depicts an approach for authenticating a creator of a document, according to one embodiment of the invention.

Authentication of a creator who creates a document and wants the document to be securely distributed to designated recipients is one of the security measures designed to curb unauthorized access to electronic documents that contain confidential or sensitive information.

Document security is a major concern at any organization, but especially in organizations in which employees utilize centralized Multi-Function Peripheral devices (MFPs). To address this issue, an organization may assign unique authentication data to each of its employees and allow the employees to use the MFP devices only upon successful authentication.

Employee authentication is a measure restricting an unauthorized party from using the printing device, and thus, protecting the resources of the organization from being misused, and protecting the intellectual property of the organization from being intercepted.

Employee authentication data may contain a string of alpha-numeric characters, and may be encoded on a portable media distributed to the employee, and stored in a central database to which the MFP has a secure access. Examples of portable media containing employees' authentication data include, but are not limited to, an employee's magnetic identification badge, magnetic identification card (for example, a SmartCard™, HID card, Casi-Rusco card, NexWatch card, etc.), data strings that an employee may enter into a data input panel of the MFP or via other MFP user interface.

A user (a creator of a document, or an intended recipient of the document) who intends to use the MFP device, may enter their authentication data into the MFP device and may be successfully authenticated by the MFP device before proceeding with using the MFP device.

There is a number of media that a user may use to enter their identification data to the MFP device. For example, users might have to log in at the MFP by swiping their magnetic identification card.

The use of magnetic identification cards is beneficial for companies with temporary workers, for example, who may not need access to scanning and color printing, while full-time employees have complete access. In addition, by employing MFP authentication and installing, for example, the Secure Release Option, MFPs can also hold print jobs until the user swipes their ID card so unintended users do not pick up confidential documents.

With single sign-on, users swipe their authentication cards once at the MFP and do not have to authenticate themselves again as they use various functions of the MFP, which further increases business operations and productivity.

Different types of user authentication may be used, depending upon the requirements of a particular implementation, and the invention is not limited to any particular type of creator's authentication.

In one embodiment, a creator is queried for creator's authentication data which include a creator's name and password that uniquely identify the creator within the organization. The creator's name and password may be encoded as two separate alpha-numeric strings and may control the functions available to the creator. The integration of a creator's log-in name and password provides a high level of security for organizations and which may be required by federal acts and other regulations. In this embodiment, creator's authentication data comprises two separate alpha-numeric strings, which the creator has to enter sequentially as prompted by the user interface module of the printing device.

According to one embodiment of the invention, a creator is queried just for a password via the user interface. If the password entered by the creator matches the original password recovered from the printing device database, then the creator is successfully authenticated.

According to another embodiment of the invention, a creator is queried for both a creator's identification (ID) and password via the user interface panel. The creator's ID may be data of any type, characteristic or size. If the creator's ID and password provided by the creator correctly match creator's ID and the original password recovered from the printing device database, then the creator is successfully authenticated.

In one embodiment, a creator is queried for a creator's authentication pin, comprising a string of alpha-numeric characters uniquely identifying the creator within the organization. In this embodiment, a creator has to enter the pin when prompted by the user interface module of the printing device.

Referring to FIG. 3, in step 302, the user interface module of the printing device receives creator's authentication data in one of the formats described above and which has been implemented in the organization utilizing the particular printing device. In one embodiment, the user interface module may receive a string comprising creator's name identifier data and then a string comprising creator's password data, and store both data strings (a name-password pair) in the storage associated with the printing device.

In one embodiment, the user interface module may receive a creator's pin data string and store the pin data string in the storage associated with the printing device.

In step 304, the user interface module authenticates the creator using the creator's authentication data. In one embodiment, the user interface module compares the data in the name-password pair entered by the creator with the name-password pairs stored in the printing device authentication data initialized and maintained by, for example, a system administrator, a manager, etc.

If the user interface module finds a match between the name-password pair entered by the creator and the name-password pairs stored in the authentication data stored in the printing device, then the creator is successfully authorized by the user interface module and the creator gains access to those functions of the printing device that have been specified by the system administrator, the manger, etc. In this case, the user interface module may display information on the user interface module display informing the creator that they have been successfully authorized to use the printing device.

However, if the match is not found, then the creator is denied access to the printing device. In this case, the user interface module may display information on the user interface module display panel, informing the creator that they have been denied access to the printing device.

If the creator was successfully authenticated, in step 306, the user interface module causes retrieval of a creator's private key. The creator's private key is an alpha-numeric data string that is used to identify the creator within the organization.

In one embodiment, the creator's private key may be retrieved from the storage associated with the printing device. Alternatively, the creator's private key may be retrieved from other storage which is communicatively coupled with the printing device. The creator's private key is used to generate a digital signature of the electronic document that the creator wants to store on the printing device. The digital signature is described in detail in FIG. 4.

Referring again to FIG. 3, upon the completion of step 306, the user interface module displays an option (or a set of options) available to the creator, including an option to scan a document. Then, the user interface module awaits until it receives an input from the creator (i.e., a creator' selection to scan a document), and passes control of the printing device to the scanning module.

In step 308, the scanning module detects that the creator has inserted a printed copy of a document into a printer device input tray, and selected a "document scanning" option from the options displayed by the user interface module and available to the creator. Subsequently, the scanning module scans the creator's printed copy of the document, generates an electronic document, and stores it in the storage associated with the printing device.

Figure 4:
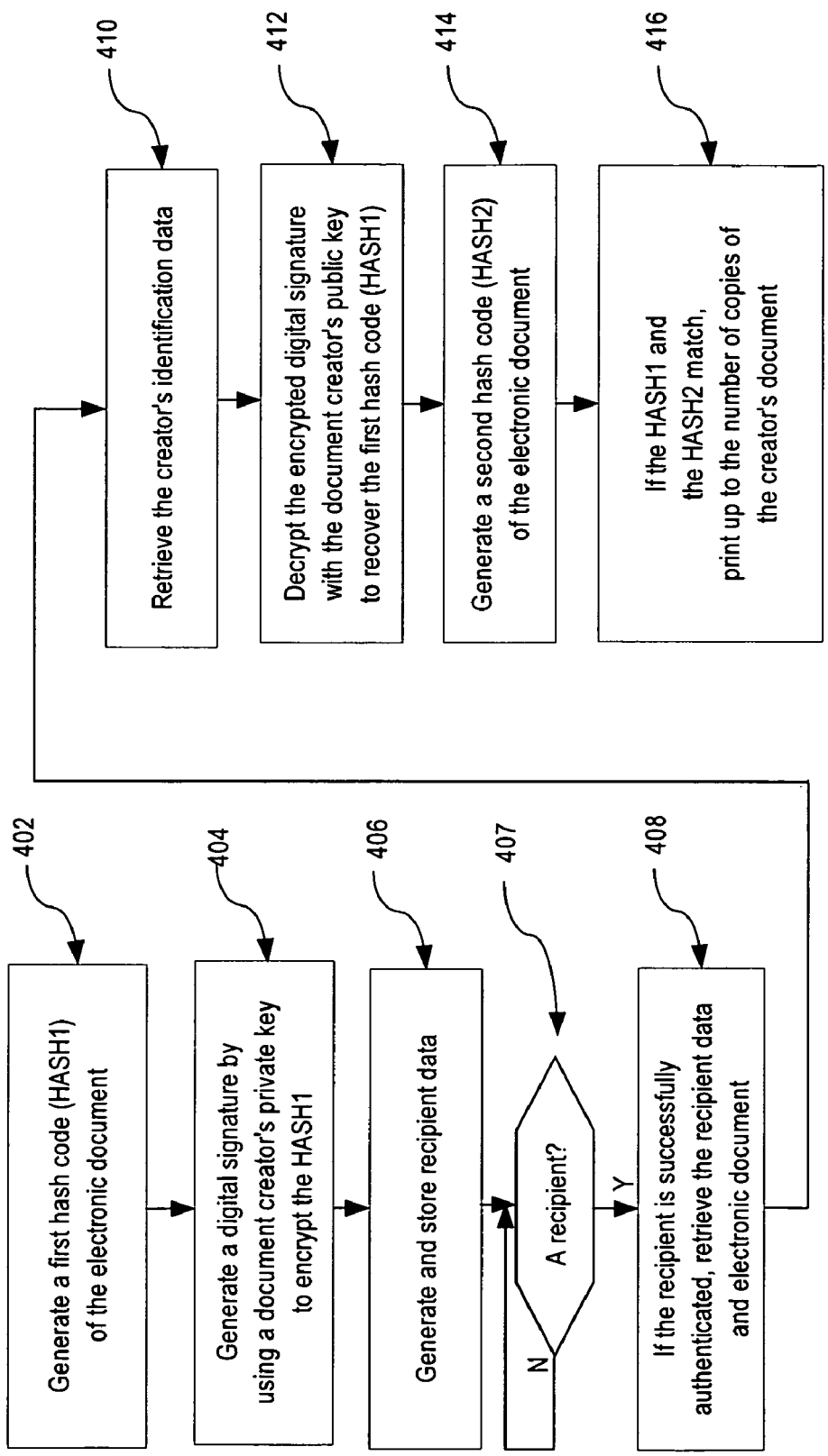
FIG. 4 is a flow diagram that depicts an approach for printing locked print data using user and print data authentication, according to one embodiment of the invention.

FIG. 4 is a flow diagram that depicts an approach for printing locked print data using user and print data authentication, according to one embodiment of the invention. In the illustrated embodiment, in step 402, the locked print module generates a digital signature for the electronic document.

A digital signature or digital signature scheme is a type of asymmetric cryptography used to simulate the security properties of a handwritten signature on paper. Digital signature schemes normally give two algorithms, one for signing which involves the user's secret or private key, and one for verifying signatures which involves the user's public key. The output of the signature process is called the "digital signature."

A signature allows authentication of a "message." Messages may be anything, from a document to an electronic mail, or even a message sent in a more complicated cryptographic protocol. Digital signatures are used to create public key infrastructure (PKI) schemes in which a user's public key (whether for public-key encryption, digital signatures, or any other purpose) is tied to a user by a digital identity certificate issued by a certificate authority. PKI schemes attempt to unbreakably bind creator's information to a public key, so that public keys can be used as a form of identification.

Digital signatures are often used to implement electronic signatures, a broader term that refers to any electronic data that carries the intent of a signature, but not all electronic signatures use digital signatures. In some countries, including the United States, and in the European Union, electronic signatures have legal significance. However, laws concerning electronic signatures do not always make clear their applicability towards cryptographic digital signatures, leaving their legal importance somewhat unspecified.

In one embodiment, the locked print module generates the creator's digital signature from a hash code of the electronic document using a document creator's private key. The hash code may be generated using a cryptographic hash function. In cryptography, a cryptographic hash function is a transformation that takes an input and returns a fixed-size string, which is called the hash value. Hash functions with this property are used for a variety of computational purposes, including cryptography, where the cryptographic hash functions are used to perform document's integrity checks. In various standards and applications, the two most-commonly used hash functions are MD5 and SHA-1.

The hash code may be viewed as a concise representation of the document from which it was computed. The hash code is a "digital fingerprint" of the document itself.

In one embodiment, the hash function transforms the electronic document to a hexadecimal or a binary string, takes that string as input and produces a fixed length string as output, sometimes termed a message digest or a digital fingerprint. The resulting output string is stored as a first hash code (HASH1) of the electronic document.

In step 404, the locked printing module, using the creator's private key, encrypts the HASH1 to generate a digital signature, and stores the digital signature in the storage associated with the printing device.

Encryption is a conversion of data to a ciphertext (i.e. an encrypted version of the document), which cannot be easily understood by an unauthorized party. Decryption is the process of converting the ciphertext into a decrypted version of data, so it can be understood. Assuming that the encryption and decryption were performed correctly, the original data and the decrypted version of the encrypted data should be the same if during the process of encrypting, transmitting and decrypting none of the data was altered by an unauthorized party.

However, if the encryption and decryption were performed correctly, but after the decryption, the decrypted version of the encrypted data is not identical to the original data, the receiver of the decrypted version of the encrypted data has evidence that somewhere during the process of encrypting, transmitting or decrypting of the data, the data was altered and/or intercepted by an unauthorized party.

Encryption is especially important in sharing documents containing confidential or sensitive documents. The stronger the cipher, the harder it is for an unauthorized party to break to the document data. However, as the strength of encryption increases, so does the cost.

There are various methods of generating an encrypted version of the electronic version of the document. For example, simple ciphers include the substitution of letters for numbers, the substitution of numbers for letters, the rotation of letters in the alphabet, etc. More complex ciphers work according to sophisticated computer algorithms that re-arrange the data bits in the electronic version of the document.

In one embodiment, the digital signature is stored in the storage associated with the printing device.

In step 406, the locked printing module responds to a creator's input, which identifies the intended recipients of the document and a number of copies of the electronic version of the document that each intended recipient may receive, generates recipient data stored in a recipient data structure, and stores the recipient data structure in the storage in association with the electronic document.

In one embodiment, the recipient data structure may be stored in a multi-dimensional table indexed by the index corresponding to a recipient identifier. The recipient's identifier may be the recipient's name, the recipient's password, the recipient's pin, or any other identifier that uniquely identifies the recipient within the organization.

In one embodiment, for each recipient intended by the creator to receive the electronic document, the recipient data structure includes a number of copies that the particular recipient is allowed to print.

Further, the recipient data structure may comprise data creator's identification data. The creator's identification data may comprise the creator's name, creator's password, creator's pin, or any other identifier that uniquely identifies the creator within the organization. The recipient data structure may also comprise any additional data facilitating carrying out the functionalities of the locked printing. The recipient data structure is stored in the storage associated with the printing device.

In one embodiment, the locked print module may cause a notification message to be sent to every intended recipient of the document specified by the creator. The notification may be sent in the form of an e-mail, a voice message, or any other notification system adopted by the organization.

In step 408, in response to, successful authentication of the recipient, and selection by the recipient of the creator document from a list of documents displayed for the recipient, the locked print module retrieves the recipient data associated with the electronic document, and from the recipient data, retrieves the creator identification data.

It is inferred here that only intended recipients, i.e. the recipients designated by the creator of the document in step 406, are going to be presented with the list of documents that they can print, and wherein the list comprises only the document created by the creator. Making sure that only intended recipients (designated by the creator of the document) may be presented with an option to print the document, is yet another security measure ensuring the secure printing of locked print data.

As described in step 406, the recipient data comprises identification data of the intended recipients of the document, and for each recipient, the recipient data comprises the number of copies of the document that the recipient may produce. As also described in step 406, the recipient data may also comprise the creator identification data, uniquely identifying the creator of the document in the organization.

In step 410, the locked print module retrieves the creator's identification data. The creator's identification data was described in detail in FIG. 3.

In one embodiment, the locked print module is further retrieve a creator's public key and determined whether the creator's public key is valid, not revoked and issued by a trusted entity.

In step 412, the locked print module, using the creator's public, decrypts the encrypted digital signature to recover the first hash code (HASH 1).

In one embodiment, the decryption algorithm is an algorithm, or formula, that "undoes" the steps of the encryption algorithm descried in step 404, that is, it has to sequentially undo each of the steps of the encrypting, but in reverse order.

The purpose of decrypting the document data is to translate the encrypted version of the data to a version that is intelligible. As described in step 404, the encryption and decryption processes are performed to ensure that the data is securely stored in the printing device until an intended recipient of the data successfully retrieves the electronic document.

Decryption is the process of converting the ciphertext into a decrypted version of the data so it can be understood. Assuming that the encryption and decryption were performed correctly, the original data and the decrypted version of the data should contain the same data if during the process of encrypting, transmitting and decrypting, none of the data was altered by an unauthorized party.

However, if the encryption and decryption were performed correctly, but after the decryption, the decrypted version of the data is not identical to the original data, the receiver of the decrypted version of the data has evidence that somewhere during the process of encrypting, transmitting or decrypting of the data, the data was altered and/or intercepted by an unauthorized party.

Various algorithms may be used to decrypt data. However, the selected decrypting algorithm or the decrypting formula has to be compatible with the encrypting algorithm (or formula) executed in step 404, and it has to sequentially undo each of the steps of the encrypting, but in reverse order.

In step 414, the locked print module generates a second hash code (HASH2) using the electronic document. The purpose of generating the second hash code is to be able to determine if from the moment the creator scanned the data to the printing device to the moment the intended recipient is about to print the electronic document, the data has not been altered or intercepted by an unauthorized party, etc. To accomplish the above stated purpose, the algorithm to generate the second hash code has to be identical to the algorithm used to generate the first hash code in step 402 described above.

In step 416, the locked print module compares the first hash code with the second hash code, and if the two hash codes match, allows the intended recipient to print up to the number of copies of the electronic document.

The purpose of the comparison of the first hash code with the second hash code is to determine whether the electronic document about to be printed by the intended recipient is indeed the document created by the creator.

This security measure identifies circumstances where an unauthorized party accessed the organization's database, used the organization's encrypting and decrypting mechanisms and substituted the original electronic document with an illegitimate electronic document otherwise properly encrypted and decrypted. This is particularly important in sharing documents containing confidential or sensitive documents.

The rationale behind the above described comparison is as follows: assuming that the encryption and decryption were performed correctly, the second hash code and the first hash code should contain the same data if an authorized party did not interfere during the process of encrypting, transmitting and decrypting.

However, if the encryption and decryption were performed correctly, but the first hash code is not identical to the second hash code, the receiver of the decrypted version of the document has evidence that somewhere during the process of encrypting, transmitting or decrypting of the data, an unauthorized party must have interfered with the data.

If the above comparison points to the fact that the data was altered and/or intercepted by an unauthorized party, an appropriate message may be sent to the creator of the document, to the system administrator and any other authority within the organization.

2) Another Operational Example of Printing Scanned Locked Print Data

Figure 5:
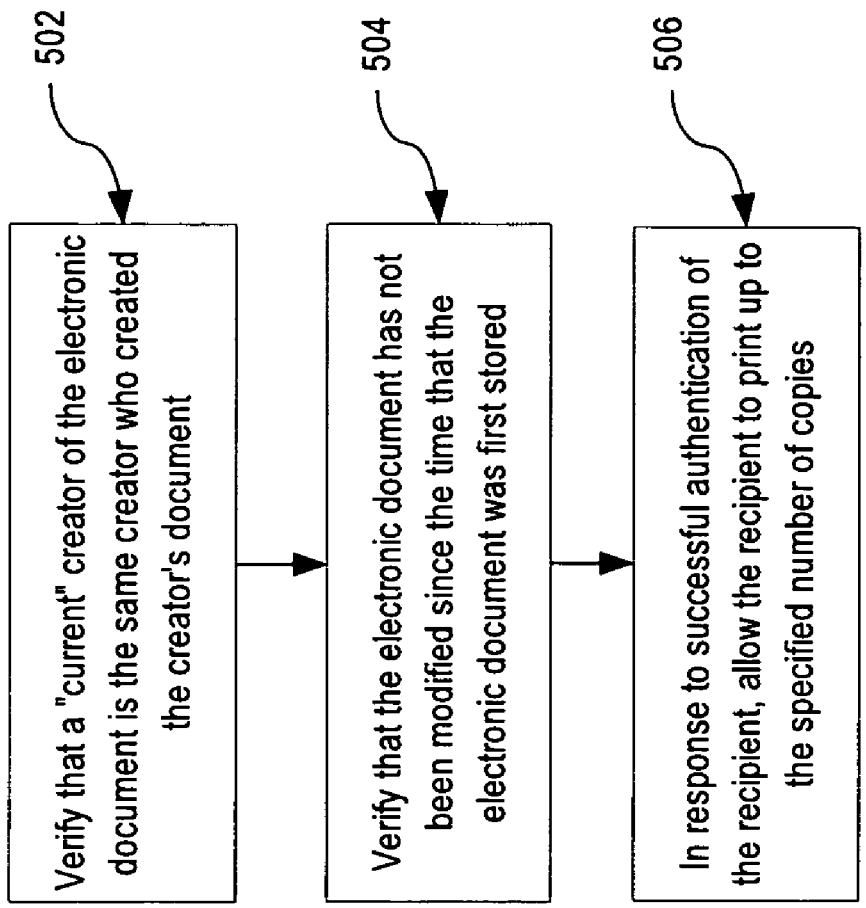
FIG. 5 is a flow diagram that depicts an approach for printing locked print data using user and print data authentication, according to one embodiment of the invention.

FIG. 5 is a flow diagram that depicts an approach for printing locked print data using user and print data authentication, according to one embodiment of the invention. In particular, FIG. 5 illustrates the mechanism of bi-directional security measures by ensuring a secure sending of the document to the printer and secure retrieval of the document from the printer by the intended recipient.

In the illustrated embodiment, the bi-directional security measures ensure that: 1) the document is received only by the intended recipient designated by the creator, 2) both the document's creator and the intended recipient are successfully authenticated, 3) the document received by the intended recipient is the document that was created by the creator, and 4) the document received by the intended recipient is identical to the document created by the creator.

In the illustrated embodiment, it is assumed that all the steps in FIG. 3 have been already performed, and thus, the creator has been successfully authenticated, the creator has designated the indented recipients of the document and specified a number of copies that each of the intended recipients may receive. Further, it is assumed that the creator has submitted the document to a printing device (either by scanning the printed copy of the document, or submitting an electronic document to the printing device via a communications link). Further, it is assumed that the document has been securely stored in the storage of the printing device.

In addition, it is assumed that an intended recipient has been notified that the printing device contains a stored document which the recipient may retrieve and that the recipient has approached the printing device and entered their identification information.

Also, it is assumed that the decrypted previously encrypted data of the document is referred to here as an electronic document, whereas the original creator of the document is referred to as a "prior creator of the electronic document that was specified at a time the electronic document was first stored on the printing device."

Finally, it is assumed that upon receiving the creator's identification data, the locked print module decrypted previously encrypted information identifying the creator of the document. The decrypted previously encrypted information identifying the creator of the document is referred to as a "current" creator.

In step 502, the locked print module verifies that a current creator of the electronic document is the same as a prior creator of the electronic document that was specified at a time the electronic document was first stored on the printing device.

In order to verify that the "current" creator of the electronic document is the same as the prior creator of the electronic document that was specified at the time the electronic document was first stored on the printing device, the locked print device might have to, for example, compare the first hash code (HASH1, described in FIG. 4) with the second hash code (HASH2, also described in FIG. 4). The details on how the HASH1 and HASH2 are computed and used are provided in FIG. 4.

If the HASH1 matches the HASH2, then there is presumption that the "current" creator of the electronic document is the same as the "prior creator" of the electronic document that was specified at the time the electronic document was first stored on the printing device, if the electronic document was not altered from the time the electronic document was stored on the printing device to the moment the electronic document is about to be retrieved by an intended recipient. Assuming that the electronic document was not altered from the time the electronic document was stored on the printing device to the moment the electronic document is about to be retrieved by an intended recipient, the HASH1 should be the same as HASH2 if the keys used to generate HASH1 and HASH2 were indeed a valid public key and a valid private key of the same creator. However, if in this case, the hashes do not match, then at least one of the keys used to produce the hashes was not a valid key of the creator. Therefore, if the hashes do not match, the "current" creator cannot the same as the "prior creator."

Upon a successful verification of the "current" creator, in step 504, the locked print module determines whether the electronic document has not been modified since the time that the electronic document was first stored on the printing device. This step ensures that the document actually retrieved by the intended recipients has not been altered from the moment it was submitted to the printing device by the creator, to the moment it has been successfully approved for printing for the intended recipients.

As discussed above, one of the concerns in transmitting secure and sensitive documents is to ensure that a secure and sensitive document that is eventually retrieved by an intended recipient is in fact the document that was created by the original creator of the original document. A breach of security measures occurs when an unauthorized party accesses the organization network or data, alters, modifies, transforms or substitutes a secure and sensitive document with another document which is not identical to the original secure document. Such a substitution compromises the security in the organization and spurs a cascade of unwanted and undesirable consequences.

In order to verify whether the electronic document has not been modified since the time that the electronic document was first stored, the locked print device might have to, for example, compare a first hash code (HASH1, described in FIG. 4) with a second hash code (HASH2, also described in FIG. 4). The details on how the HASH1 and HASH2 are determined and used are provided in FIG. 4.

If the HASH1 matches the HASH2, then there is presumption that the electronic document has not been modified since the time that the electronic document was first stored if the "current" creator of the electronic document is the same as the "prior creator" of the electronic document that was specified at the time the electronic document was first stored on the printing device. Assuming that the "current" creator of the electronic document is the same as the "prior creator" of the electronic document that was specified at the time the electronic document was first stored on the printing device, the keys used to generate the HASH1 and the HASH2 should be valid keys of the same creator. Therefore, the HASH1 should be the same as HASH2 if the hashes were computed using identical electronic documents. However, if the hashes do not match, then the hashes much have been computed using different electronic documents, and it should be concluded that the original electronic document was tampered with.

In step 506, in response to successful authentication of the recipient, the locked print process allows the recipient to print up to the specified number of copies of the electronic document. As described above the "recipient" is an intended recipient of the electronic document and has been implicitly identified by the creator when the creator submitted the document to the printing device. This security measure ensures that only intended recipients may have access to the document and that only intended recipients may print copies of the document.

Further, this security measure ensures that the intended recipient may only print up to the specified number of copies of the electronic document. Limiting the number of copies that the intended recipient may print helps to manage and control the total number of copies of confidential and secure documents that are circulated within the organization, and thus prevents from making any unauthorized copies even by recipients who have been implicitly identified by the creators of confidential and sensitive documents.

III. Implementation Mechanisms

Figure 6:
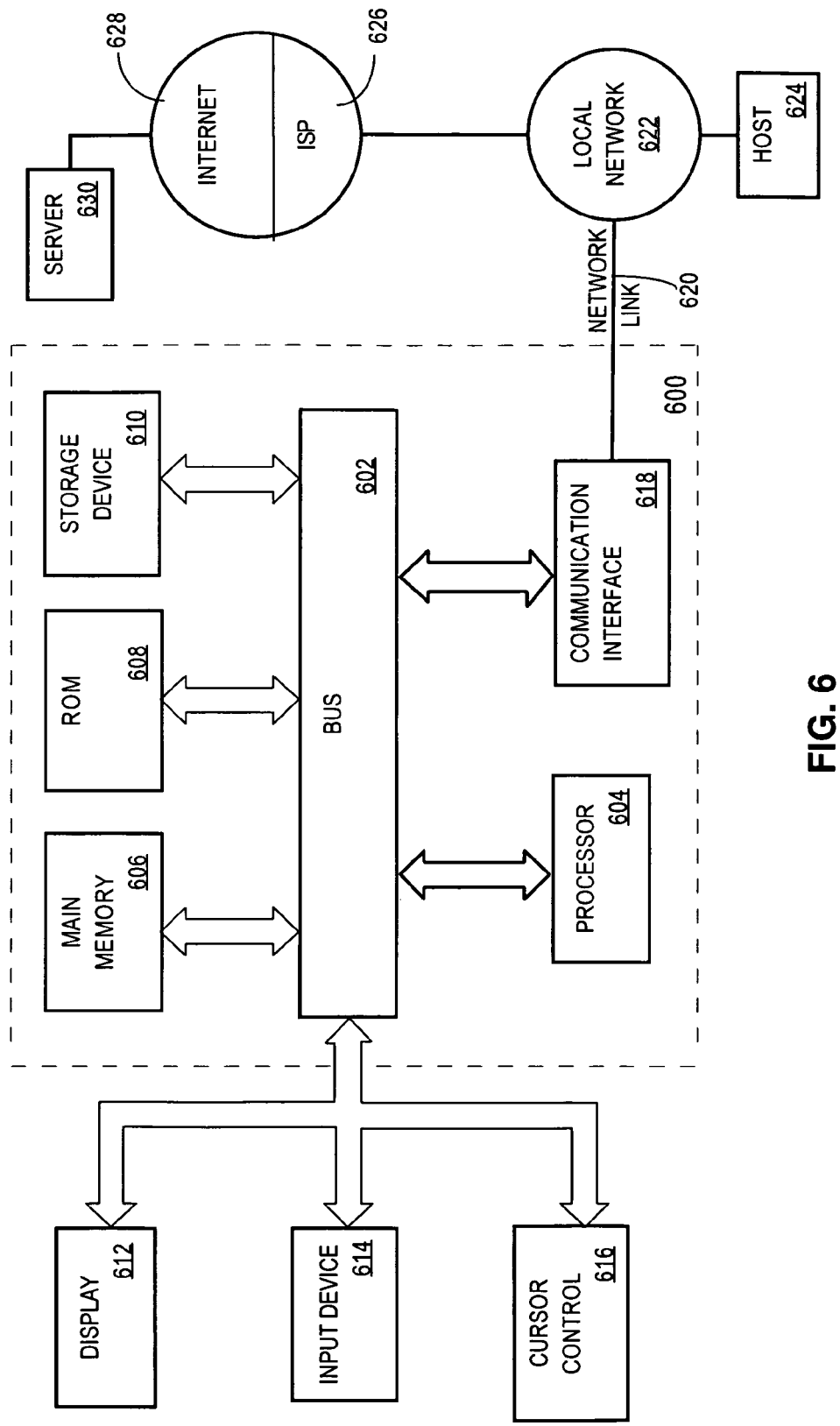
FIG. 6 is a block diagram of a computer system on which embodiments of the invention may be implemented.

The approach described herein for secure printing of electronic documents using bi-directional (submitting and releasing) document protection, and locked printing mechanism may be implemented on any type of computing platform or architecture. For purposes of explanation, FIG. 6 is a block diagram that illustrates a computer system 600 upon which an embodiment of the invention may be implemented. Computer system 600 includes a bus 602 or other communications mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during processing of instructions by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for implementing the techniques described herein. According to one embodiment of the invention, those techniques are performed in response to processor 604 processing more instructions contained in main memory 606. Such instructions may be read into main memory 606 from another computer-readable medium, such as storage device 610. Processing of the instructions contained in main memory 606 causes the process steps described herein to be performed. One or more processors in a multi-processing arrangement may also be employed to process the instructions contained in main memory 606. In alternative embodiments, hard-wired circuitry may be used in place of or in combination with software instructions to implement the invention. Thus, embodiments of the invention are not limited to any specific implementation of hardware circuitry, computer software, or any combination of hardware circuitry and computer software.

The term "computer-readable medium" as used herein refers to any medium that participates in providing instructions to processor 604 for execution. Such a medium may take many forms, including but not limited to, non-volatile media, volatile media, and transmission media. Examples of non-volatile media include, without limitation, optical or magnetic disks, such as storage device 610. One example of volatile media includes, without limitation, dynamic memory, such as main memory 606. Examples of transmission media include, without limitation, coaxial cables, copper wire, optical fibers, the wires that comprise bus 602, and electromagnetic radiation, such as that generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, or any other medium from which a computer can read.

Various forms of computer readable media may be involved in carrying instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infrared transmitter to convert the data to an infrared signal. An infrared detector coupled to bus 602 can receive the data carried in the infrared signal and place the data on bus 602. Bus 602 carries the data to main memory 606, from which processor 604 retrieves and processes the instructions. The instructions received by main memory 606 may optionally be stored on storage device 610 either before or after execution by processor 604.

Computer system 600 also includes a communications interface 618 coupled to bus 602. Communications interface 618 provides a two-way data communications coupling to a network link 620 that is connected to a local network 622. For example, communications interface 618 may be an integrated services digital network (ISDN) card or a modem to provide a data communication connection to a corresponding type of telephone line. As another example, communications interface 618 may be a local area network (LAN) card to provide a data communication connection to a compatible LAN.

Wireless links may also be implemented. In any such implementation, communications interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the worldwide packet data communication network now commonly referred to as the "Internet" 628. Local network 622 and Internet 628 both use electrical, electromagnetic or optical signals that carry digital data streams. The signals through the various networks and the signals on network link 620 and through communications interface 618, which carry the digital data to and from computer system 600, are example forms of carrier waves transporting the information.

Computer system 600 can send messages and receive data, including instructions, through the network(s), network link 620 and communications interface 618. In the Internet example, a server 630 might transmit a request for an application program through Internet 628, ISP 626, local network 622 and communications interface 618. Processor 604 may execute the instructions as they are received, and/or stored in storage device 610, or other non-volatile storage for later execution.

Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A printing device comprising:
    a user interface module, communicatively coupled with a local memory, the user interface module configured to:
        display information to users and recipients;
        receive user authentication data;
        authenticate the user using the user authentication data;
        in response to successful authentication of the user authentication data, cause retrieval of a user private key associated with the user;
    a scanning module, communicatively coupled with the local memory, the scanning module configured to:
        scan a printed document and store it in the local memory as an electronic document;
    a locked print module, communicatively coupled with the local memory, the locked print module configured to:
        generate a first hash code of the electronic document;
        generate a digital signature using the user private key to encrypt the first hash code of the electronic document;
        in response to a user input received from the user who provided the printed document,
            generate recipient data that specifies one or more intended recipients of the electronic document, a number of copies of the electronic document that each recipient is allowed to print, and user identification data that identifies the user of the electronic document, and
            store, in the printing device, the digital signature and the recipient data in association with the electronic document;
        cause sending of an electronic notification to each of the one or more intended recipients of the electronic document, wherein the electronic notification indicates that the electronic document is available for printing;
    in response to successful authentication of the recipient and selection by the recipient of the electronic document from a list of documents displayed for the recipient:
        retrieve the electronic document and the digital signature from the printing device, and from the recipient data, retrieve the user identification data;
        using the user identification data, retrieve a user public key;
        using the user public key, decrypt the digital signature to recover the first hash code;
        generate a second hash code using the electronic document;
        determine whether the first hash code matches the second hash code;
        in response to determining that the first hash code matches the second hash code, allow the recipient to print up to the number of copies of the electronic document.

2. A printing device of claim 1, wherein the locked print module is further configured to:
    determine whether the private key and the public key are valid, not revoked and issued by a trusted entity.

3. A printing device of claim 1, wherein the user interface module is further configured to:
    cause authentication of the user using a user authentication card.

4. A printing device of claim 1, wherein the user interface module is further configured to:
    cause authentication of recipient using a recipient authentication card.

5. A printing device comprising:
    a user interface module, communicatively coupled with a local memory, the user interface module configured to:
        display information to users and recipients;
        receive user authentication data;
        authenticate the user using the user authentication data;
        in response to successful authentication of the user authentication data, cause retrieval of a user private key associated with the user;
    a locked print module, communicatively coupled with the local memory, the locked print module configured to:
        receive an electronic document from a client application residing on a client device via a communications link established between the client device and the printing device;
        store the electronic document in the local memory;
        generate a first hash code of the electronic document;
        generate a digital signature using the user private key to encrypt the first hash code of the electronic document;
        in response to a user input received from the user who provided the printed document,
            generate recipient data that specifies one or more intended recipients of the electronic document, a number of copies of the electronic document that each recipient is allowed to print, and user identification data that identifies the user of the electronic document, and store, in the printer device, the digital signature and the recipient data in association with the electronic document;

cause sending of an electronic notification to each of the one or more intended recipients of the electronic document, wherein the electronic notification indicates that the electronic document is available for printing;

in response to successful authentication of the recipient and selection by the recipient of the electronic document from a list of documents displayed for the recipient:

retrieve the electronic document and the digital signature from the printing device;

retrieve the recipient data associated with the electronic document, and from the recipient data, retrieve the user identification data;

using the user identification data, retrieve a user public key;

using the user public key, decrypt the digital signature to recover the first hash code;

generate a second hash code using the electronic document;

determine whether the first hash code matches the second hash code;

in response to determining that the first hash code matches the second hash code, allow the recipient to print up to the number of copies of the electronic document.

6. A printing device of claim 5, wherein the locked print module is further configured to:

determine whether the private key and the public key are valid, not revoked and issued by a trusted entity.

7. A printing device of claim 5, wherein the user interface module is further configured to:

cause authentication of the user using a user authentication card.

8. A printing device of claim 5, wherein the user interface module is further configured to:

cause authentication of the recipient using a recipient authentication card.

* * * * *